United States Patent [19]
Raney et al.

[11] Patent Number: 5,212,647
[45] Date of Patent: May 18, 1993

[54] DIE STAMPING PRESS HAVING CCD CAMERA SYSTEM FOR AUTOMATIC 3-AXIS DIE REGISTRATION

[75] Inventors: Joseph E. Raney, Kansas City; Charles C. Raney, Shawnee, both of Kans.

[73] Assignee: Preco Industries, Inc., Lenexa, Kans.

[21] Appl. No.: 812,715

[22] Filed: Dec. 23, 1991

Related U.S. Application Data

[63] Continuation-in-part of Ser. No. 729,933, Jul. 15, 1991, abandoned.

[51] Int. Cl.$^5$ .......................... G06F 15/46; B26D 5/34
[52] U.S. Cl. .......................... 364/474.34; 364/474.09; 364/476; 83/34; 83/76.7; 356/390; 358/107
[58] Field of Search .................. 364/167.01, 469, 470, 364/471, 474.09, 474.34, 476, 559; 83/34, 76.7; 356/237, 387, 390; 358/101, 107; 250/548, 561, 559

[56] References Cited

U.S. PATENT DOCUMENTS

| | | | |
|---|---|---|---|
| 3,762,250 | 10/1973 | Huskey | 83/27 |
| 3,811,768 | 5/1974 | Zahn et al. | 83/205 |
| 4,205,769 | 6/1980 | Blitchington | 226/24 |
| 4,328,553 | 5/1982 | Fredriksen et al. | 364/559 |
| 4,481,533 | 11/1984 | Alzmann et al. | 358/101 |
| 4,520,702 | 6/1985 | Davis et al. | 83/71 |
| 4,527,243 | 7/1985 | Loose | 364/469 |
| 4,538,177 | 8/1985 | Morison | 358/101 |
| 4,541,317 | 9/1985 | Van Humbeeck et al. | 83/34 |
| 4,541,722 | 9/1985 | Jenks | 356/376 |
| 4,555,968 | 12/1985 | Raney et al. | 83/209 |
| 4,653,369 | 3/1987 | Dunsirn | 83/411 R |
| 4,697,485 | 10/1987 | Raney | 83/34 |
| 4,735,961 | 2/1988 | Pearl | 364/507 |
| 4,738,175 | 4/1988 | Little et al. | 83/71 |
| 4,748,571 | 5/1988 | Shirpy | 364/474.34 |
| 4,779,001 | 10/1988 | Makosch | 250/548 |
| 4,814,626 | 3/1989 | Doemens et al. | 250/561 |
| 4,845,373 | 7/1989 | Jamieson et al. | 250/548 |
| 4,926,917 | 5/1990 | Kirbach | 144/356 |
| 4,951,223 | 8/1990 | Wales et al. | 364/507 |
| 4,958,307 | 9/1990 | Nishimura | 364/551.01 |
| 4,961,149 | 10/1990 | Schneider et al. | 364/469 |
| 4,963,728 | 10/1990 | Hof et al. | 250/561 |
| 4,995,087 | 2/1991 | Rathi et al. | 382/8 |
| 5,036,574 | 8/1991 | Kakimoto | 29/335 |
| 5,042,341 | 8/1991 | Greten et al. | 83/75.5 |
| 5,079,981 | 1/1992 | Singer et al. | 83/72 |
| 5,138,667 | 8/1992 | Roch et al. | 382/1 |

Primary Examiner—Joseph Ruggiero
Assistant Examiner—Paul Gordon
Attorney, Agent, or Firm—Hovey, Williams, Timmons & Collins

[57] ABSTRACT

In a die cutting press, a registration system for successively positioning a die unit in predetermined relationship to defined areas of an elongated material includes servomotors or the like for moving the die unit in a direction transverse to the path of travel of the material, and for rotating the die unit relative to the material. At least one camera is provided for receiving images, and is focused on predetermined locations relative to the die unit corresponding to predetermined positions of indicia included on the material adjacent each of the defined areas. Alternately, a prism or the like may be fixed to the die unit for directing an image from a region of the die unit toward the camera, the region including a preset location of the die unit corresponding to the position of an indicium when the elongated material is in the desired position relative to the die unit. Where a prism is employed, a reference indicium may be provided thereon which appears within the directed image received by the camera. Reference image data representative of the desired position of the area indicia within the images received by the camera is compared with the images actually received and longitudinal, lateral and angular difference data is generated which is representative of this difference. In response to the generated data, the material and die unit are substantially simultaneously shifted as may be required to compensate for the difference in position so that one of the defined areas of the material is in register with the die unit.

24 Claims, 8 Drawing Sheets

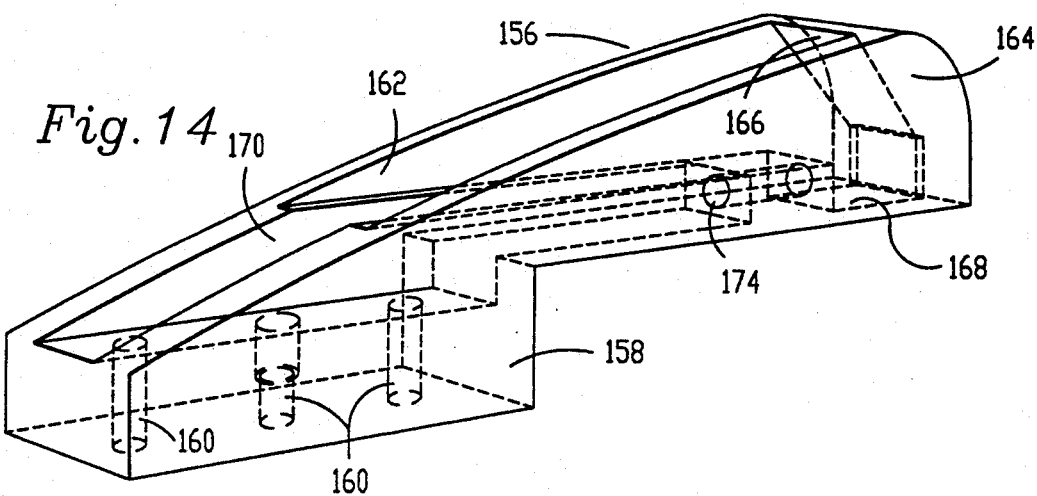
Fig.14
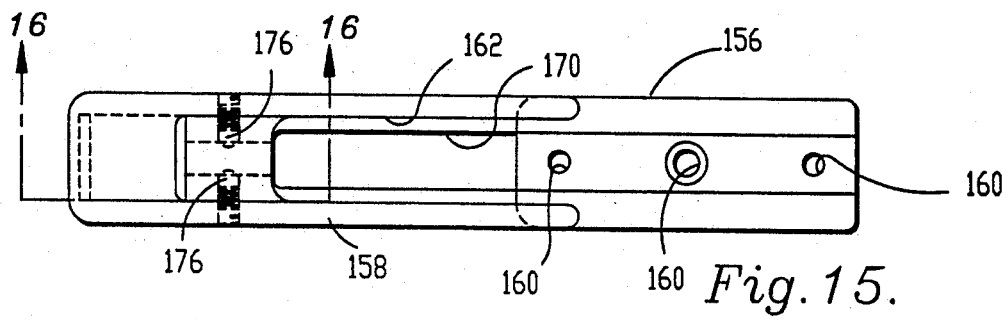
Fig.15.
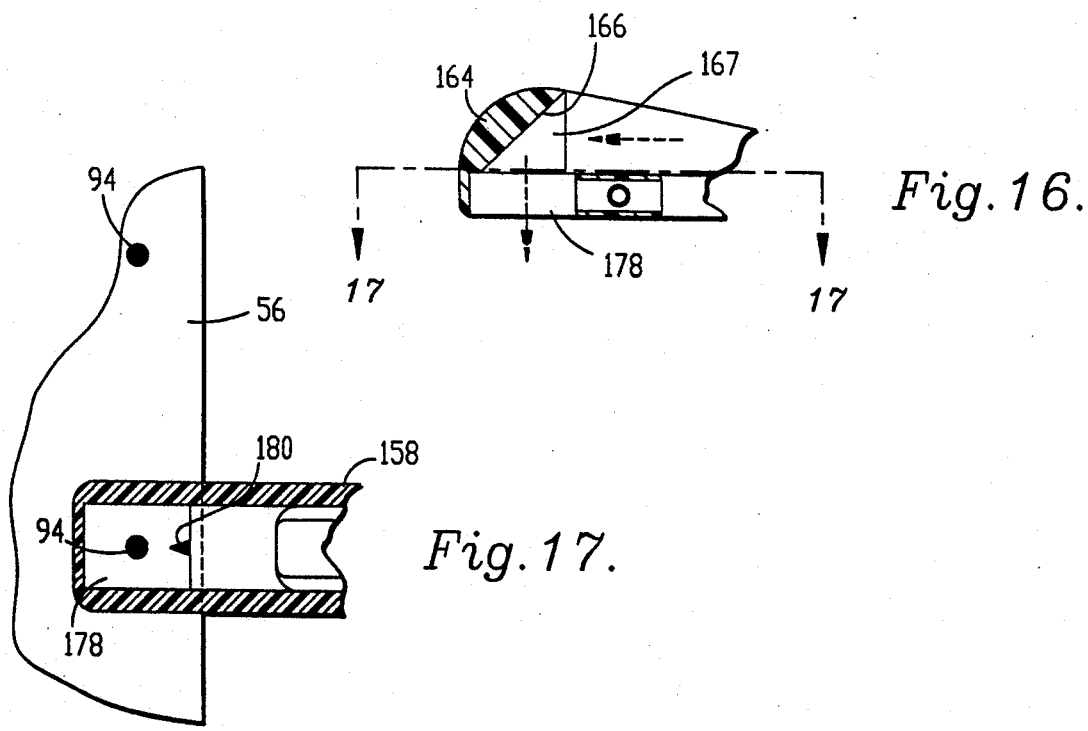
Fig.16.
Fig.17.

DIE STAMPING PRESS HAVING CCD CAMERA SYSTEM FOR AUTOMATIC 3-AXIS DIE REGISTRATION

RELATED APPLICATIONS

The present application is a continuation-in-part of U.S. patent application Ser. No. 07/729,933, filed Jul. 15, 1991, now abandoned, entitled Die Stamping Press Having CCD Camera System For Automatic 3-Axis Die Registration.

BACKGROUND OF THE INVENTION

1. Field of the Invention

The present invention relates generally to a die cutting press and, more particularly, to a registration system for registering defined areas of web, strip or sheet material with a die unit provided on the cutting press in order to permit accurate cutting of the material.

2. Discussion of the Prior Art

A die cutting press is disclosed in U.S. Pat. No. 4,555,968, to Raney. The press disclosed in U.S. Pat. No. 4,555,968 has a shiftable die unit supported on a cushion of air, and the die unit is movable laterally of the direction of travel of the web or strip as well as rotatably about an upright axis perpendicular to the material in order to bring the die unit into precise registration with defined areas of the material to be processed or cut by the press.

Automatic operation of this known press is provided by a control system having two groups of photo-optical sensors which are disposed to detect the presence of two T-shaped marks provided on opposite sides of the material adjacent each defined area to be cut. The control system is electrically coupled to servomotor mechanisms for adjustably positioning the die unit once advancement of the material is interrupted and a defined area on the material is in general proximity to work structure of the press die unit.

Although a die cutting press having an automatic die registration system, as illustrated in U.S. Pat. No. 4,555,968, represents a significant advance in the art, it would be desirable to increase the operational speed of such a press so that greater amounts of material can be processed. However, it is important that extreme registration accuracy of the die unit with the defined areas be maintained so that the defined areas are precisely severed from the material within very small dimensional tolerances.

As shown in U.S. Pat. No. 4,697,485, to Raney, a die cutting press is provided with a registration system which is operable to provide precise alignment of a shiftable die cutting unit along two axes during the time that the material is advanced along a third axis toward the die unit, so that as soon as a defined area of the material reaches the die unit, the press can be immediately actuated to subject the material to the die cutting operation. Continuous monitoring of an elongated indicator strip provided on the material enables the die unit to be shifted as necessary during travel to insure lateral and angular registration prior to the time that material advancement is interrupted.

The registration system as illustrated in U.S. Pat. No. 4,697,485 represents another significant advance in the art. However, it would be desirable to further increase the operational speed of such a press so that greater amounts of material can be processed. It is also desirable to increase the accuracy of the positioning operations carried out by the system in order to reduce registration errors that may result in a defective product.

OBJECTS AND SUMMARY OF THE INVENTION

It is an object of the present invention to provide a registration system for a die cutting press that permits defined areas of an elongated web or strip of material to be brought into registration with a movable die unit in order to permit an accurate cut of the material to be made.

It is a further object of the invention to provide a registration system which quickly and accurately aligns defined areas of a web or strip of material with a movable die unit without requiring the use of elaborate or continuous marks or of more than two sensing devices for determining the location of the marks relative to the die unit.

Another object of the present invention is to provide a registration system employing one or more reference indicia fixed on a bolster of the press for indicating the position at which indicia on the strip of material appear when defined areas of the elongated material are in a desired predetermined relationship relative to the die unit supported on the bolster.

A still further object of the invention is to provide a system that is automatically adjustable to compensate for movement or vibration of a camera or cameras of the system relative to the bolster and die unit in order to increase the accuracy with which material may be registered with the die unit.

In accordance with these and other objects, a registration system is provided for a die cutting press used in cutting strip or web material having defined, successive areas and indicia provided in predetermined positions relative to each of the defined areas. The press in which the registration system is used includes a base platen, a ram platen shiftable toward and away from the base platen, a die unit received in the space between the base platen and the ram platen, and longitudinal shifting means for longitudinally advancing the material along a path of travel to successively feed the defined areas of the material toward the die unit.

The registration system of the present invention successively positions the die unit in predetermined relationship to the defined areas of the material as successive defined areas are brought into a position to be processed by the die unit. The registration system includes lateral shifting means for moving the die unit relative to the base platen along a straight direction of travel transverse to the path of travel of the material, and angular shifting means for rotating the die unit relative to the base platen about a reference axis perpendicular to a plane containing the material.

At least one camera is provided for receiving images, and means for focusing the camera on illuminated predetermined locations relative to the die unit corresponding to the predetermined positions of the indicia relative to the defined areas of the material. Reference means provide reference image data representative of the desired positions of the indicia within the images received by the camera, and comparison means are included in the system for comparing the reference image data with the images received by the at least one camera and for generating longitudinal, lateral and angular difference data representative of the differences in position between the indicia within the images and the desired positions of the indicia.

Control means receive the longitudinal, lateral and angular difference data and operate the longitudinal, angular and lateral shifting means to change the position of the material relative to the die unit to compensate for the differences in position between the indicia within the images and the desired positions of the indica so that one of the defined areas of the material is in register with the die unit.

By constructing a registration system in accordance with the present invention, numerous advantageous results are realized. For example, by providing the inventive registration system with means for providing reference image data representative of the desired positions of the indicia within the images received by the at least one camera, it is possible to allow the use of marks of any desired shape or size simply by programming the desired data into the system. Also, flexibility is achieved by permitting an operator to adjust the data to reflect desired changes in the desired positions of the indicia within the images received by the camera. Thus, variations in the process are easily accommodated.

Another advantage realized through the use of the inventive system is the increase in speed of the system achieved by carrying out simultaneous adjustment of the position of the material in three dimensions relative to the die unit in order to reduce the amount of time necessary to align the material and die unit prior to cutting of the material.

According to a further aspect of the present invention, a registration system includes a camera attachable to the die unit at a position laterally disposed from the elongated material, and image directing means fixed to the die unit for directing an image from a region of the die unit toward the camera. The region represented in the image includes a preset location of the die unit corresponding to the position at which an indicium on the material appears when the elongated material is in a desired predetermined relationship relative to the die unit. The image directing means includes a reference indicium which appears within the reflected image at a fixed position relative to the preset location.

Reference means are provided for producing reference image data representative of the position of the preset location within the images received by the camera. Comparison means compare the reference image data with images received by the camera and generate longitudinal, lateral and angular difference data representative of the difference between the positions of the indicia within the images and the position of the preset location. The longitudinal, angular and lateral shifting means are operated in response to the comparison to change the position of the material relative to the die unit to compensate for the difference in position between the indicia and the preset location so that the die unit is in the desired position relative to one of the defined areas of the material.

By providing this construction of the inventive system, several additional benefits are obtained beyond those mentioned above. For example, by fixing reference indicia on the bolster supporting the die unit at predetermined positions, it is possible to calibrate the reference means during each cycle of operation of the press in order to remove any registration errors that would normally result from movement or vibration of the camera or cameras of the system relative to the bolster supporting the die unit.

Further, by using a camera that is attachable to the bolster at a position laterally disposed from the elongated material, it is possible to quickly position or replace the camera on a die unit and to calibrate the reference means without the necessity for making time consuming measurements.

A method of successively aligning a die unit of a die cutting press with defined areas of strip or web material, in accordance with the present invention, includes among other steps, the steps of focusing at least one camera on predetermined locations relative to the die unit corresponding to predetermined positions of indicia disposed on a strip or web of material, and comparing the images received by the at least one camera with reference image data indicative of desired positions of the indicia within the images. Thereafter, longitudinal, lateral and angular difference data is generated which is representative of the differences in position between the indicia within the images and the desired positions of the indicia, and movement of the material in the longitudinal, lateral and angular directions is carried out to compensate for the differences in longitudinal, lateral and angular position between the indicia within the images and the desired positions of the indicia so that one of the defined areas of the material is in register with the die unit.

BRIEF DESCRIPTION OF THE DRAWING FIGURES

A preferred embodiment of the invention is described in detail below with reference to the attached drawing figures, wherein:

FIG. 14 is a perspective view of a reflecting assembly of the registration system illustrated in FIG. 13;

FIG. 15 is a top plan view of the reflecting assembly;

FIG. 16 is a sectional view of the reflecting assembly taken along line 16—16 of FIG. 15; and FIG. 17 is a sectional view of the reflecting assembly taken along line 17—17 of FIG. 16, illustrating the position of a web or strip of material relative to the assembly.

DETAILED DESCRIPTION OF THE PREFERRED EMBODIMENTS

Figure 1:
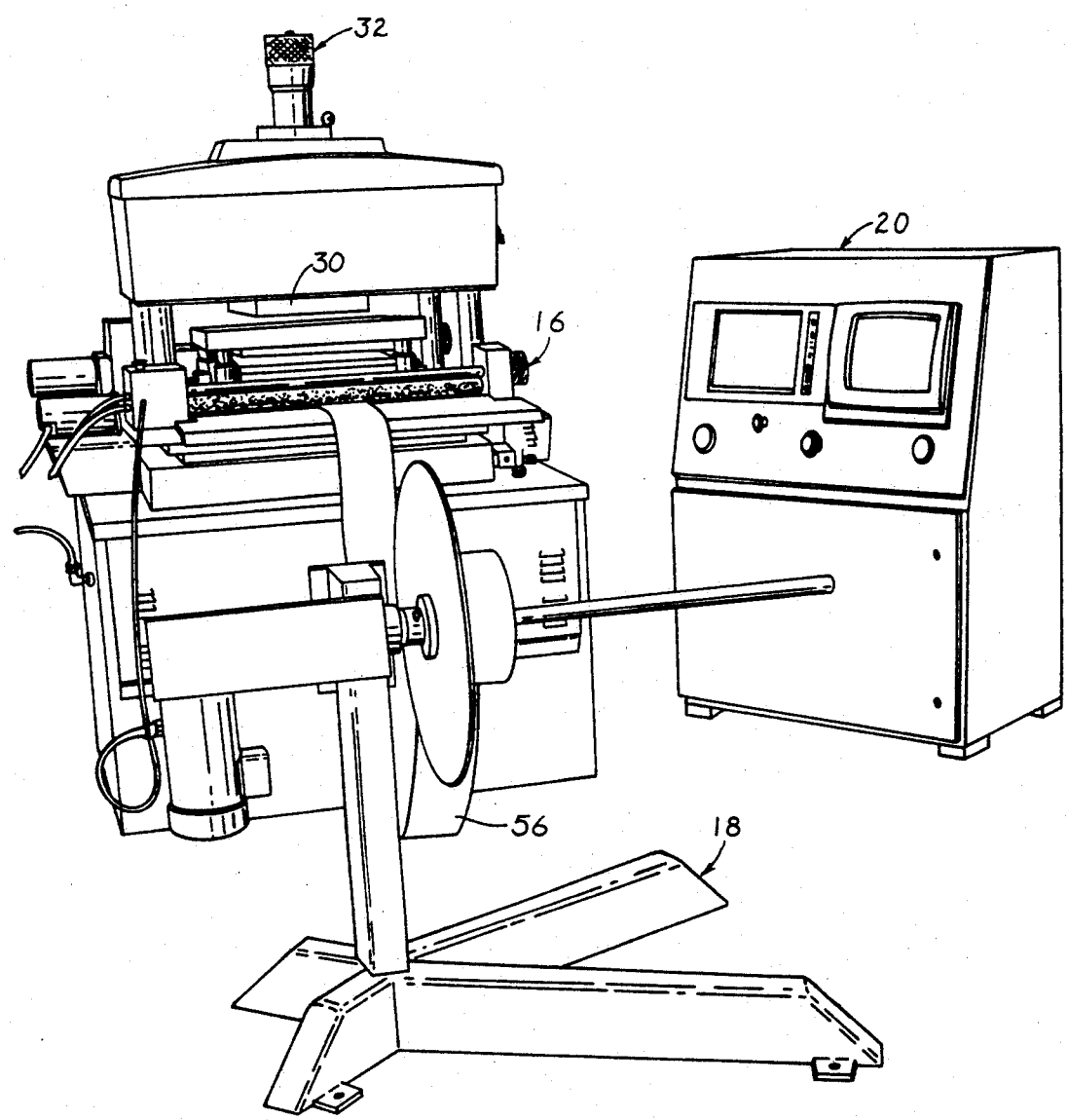
FIG. 1 is a perspective view of a die stamping press including a registration system constructed in accordance with a first embodiment of the present invention.

A die cutting press constructed for use with the present invention is illustrated in FIG. 1, and includes a die cutting press 16, an unwind/rewind stand 18, and a computer control assembly 20.

Figure 3:
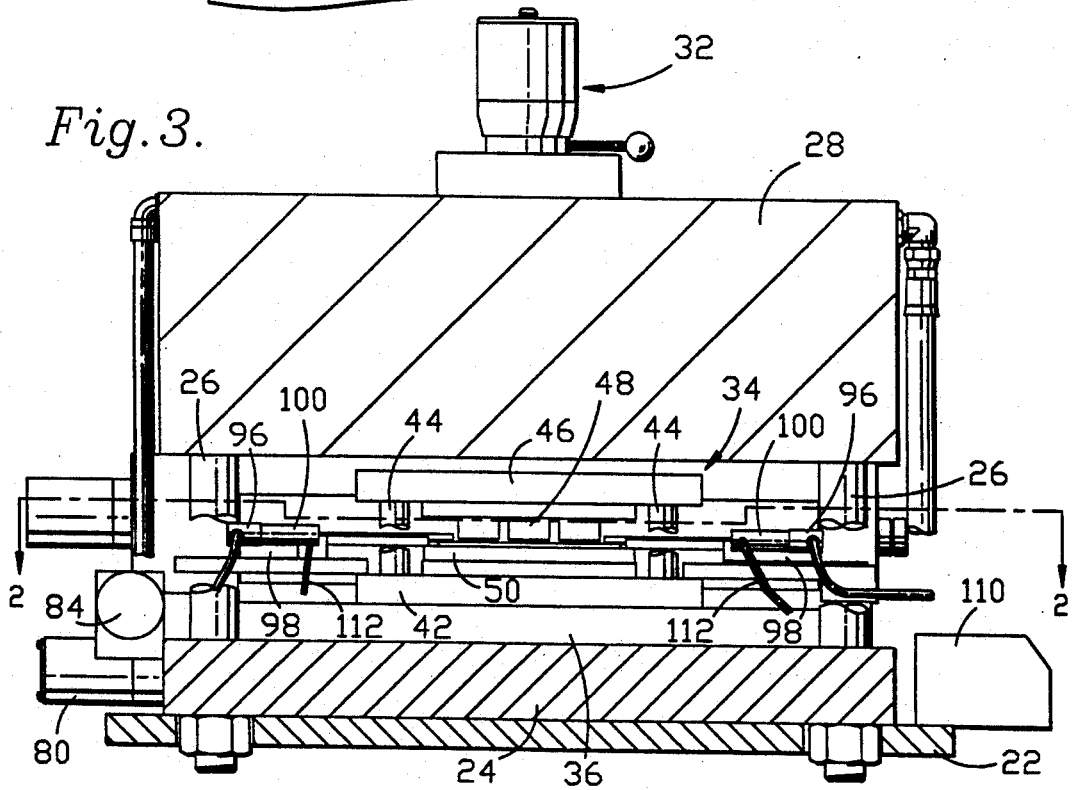
FIG. 3 is a sectional view along line 3—3 of FIG. 2.

Turning to FIG. 3, the die cutting press is shown in greater detail. It is noted that with the exception of the registration system of the present invention to be described below, the press is in general similar to the press disclosed in the aforementioned U.S. Pat. No. 4,555,968, which is hereby expressly incorporated into the disclosure of the present invention.

The press includes a horizontal support member 22 which carries a base platen 24 of relatively heavy, thick metal stock. Four upstanding rods 26 are fixed to respective corners of the base platen and support an upper frame assembly 28. A ram platen 30 is reciprocally carried by the rods below the frame assembly and is vertically shiftable by means of a piston. A micrometer unit 32 mounted to the top of the assembly 28 permits selective adjustment of the extent of vertical shifting of the ram platen 30.

A die unit 34 rests on a floating bolster 36 having a lower plate 38 that engages the upper surface of the base platen. An upper plate 40 of the bolster is mounted directly above the lower plate and carries an overlying die holder 42 of the die unit. Four spring biased cylinder assemblies 44 are positioned adjacent corresponding corners of the die holder for supporting a punch holder 46 over the die holder while permitting movement of the punch holder toward the die holder in opposition to the force of the springs of the spring cylinders 44. One or more punches 48 are secured to an underside of the punch holder, while a similar number of dies 50 are mounted to the top of the die holder 42.

The spring cylinders are biased to normally hold the punch holder 46 in spaced relationship to the die holder 42 in order to permit web or strip material 56 to be passed and positioned therebetween. The ram platen 30 functions solely to selectively transmit a downward force to the punch holder 46 in order to carry out a die cutting of the defined areas of the material. The ram platen is not affixed to any component of the die unit.

The terminology "die cutting" as used herein is intended to be construed generically and to encompass various types of processing operations including but not limited to stamping, cutting, punching, piercing, blanking, embossing and other equivalent procedures.

Figures 4, 5:
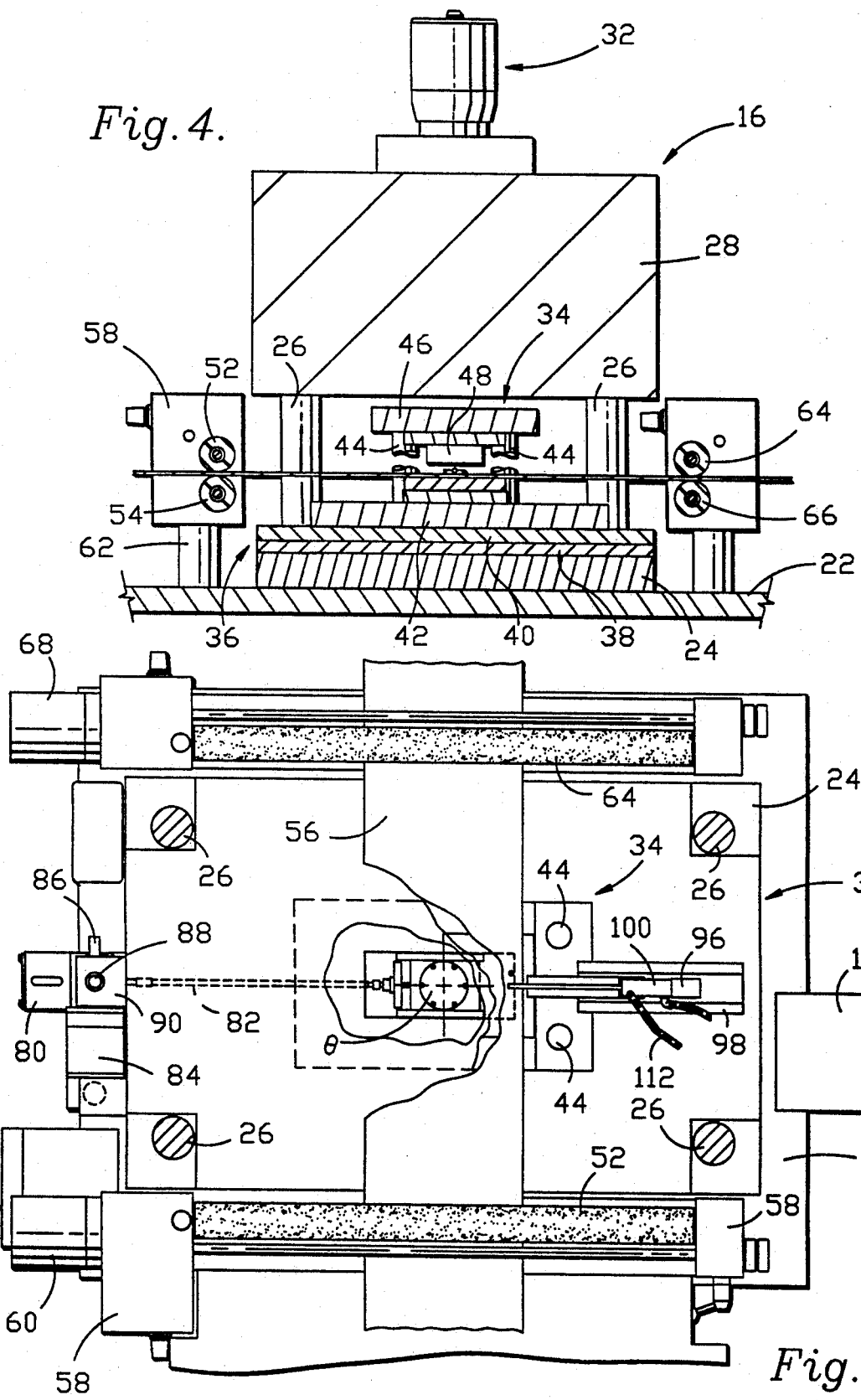
FIG. 4 is a sectional view along line 4—4 of FIG. 2.
FIG. 5 is a sectional view taken along line 2—2 of FIG. 3, and is partially cut away to illustrate a bolster mounting arrangement employed in the preferred embodiment of the present invention.

As shown in FIG. 4, the press has a vertically aligned pair of infeed rollers 52, 54 that provide friction engagement of the material 56 for advancing the material in a longitudinal direction parallel to the length of the material toward the die unit 34. As illustrated in FIG. 5, the rollers 52, 54 are rotatably supported on each end by suitable bearing assemblies 58, and the lower infeed roller 54 is driven by a bi-directional servomotor 60 carried by one of the bearing assemblies. A support 62 is secured to the press and carries the bearing assemblies.

Viewing FIG. 4, the outfeed end of the press has a pair of vertically aligned outfeed rollers 64, 66 that are generally identical with the infeed rollers and function to support the material therebetween. The rollers 64, 66 are rotatably fixed at each end thereof to bearing assemblies 58 supported on the press or by a table adjacent the press, and a bi-directional servomotor 68 is provided for powering the lower outfeed roller 66, the servomotor 68 being wired in parallel with the servomotor 60 so that the lower infeed roller 54 rotates in synchronous movement to rotation of the lower outfeed roller 66.

As illustrated in U.S. Pat. No. 4,555,968, the lower plate of the bolster has openings which receive corresponding air bearings that have a plurality of air outlet ports disposed downward in facing relationship to the upper surface of the base platen. The bearings are connected to a source of pressurized air so that the bolster and thus the die unit can be selectively supported by a cushion of air for purposes to be explained hereinafter.

Figure 6:
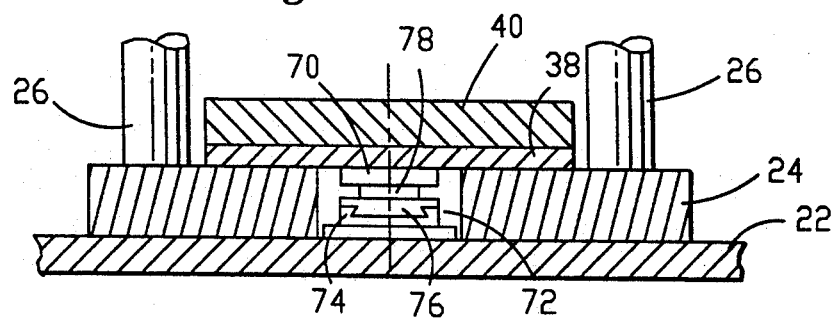
FIG. 6 is a partial sectional view of the bolster mounting arrangement.

Turning to FIG. 6, the lower plate 38 of the bolster 36 is secured to a support 70 which in turn is pivotally connected to a slide member 72. A stationary element 74, secured to the support 70, has a horizontally extending groove that presents a dove-tail configuration in transverse cross-section. The member 72 has a lower portion 76 which is slidable in the groove and is complemental in configuration to the same. A bearing 78 which rotatably couples the support to the slide member 72 allows the support 70 and thereby the components resting thereon to shift vertically through a limited displacement without permitting such components to shift laterally.

As shown in FIG. 5, a bi-directional servomotor 80 is connected to a shaft 82 that includes a threaded member which is received by a threaded portion of the slide member 72. Operation of the motor 80 effects rotation of the shaft to slide the member 72 along the groove, so that the bolster 36 and thereby the die unit 34 can be selectively shifted in a lateral direction, which may be termed the Y axis, relative to the material 56. As will be understood, the Y axis extends in a direction which is horizontally transverse to the path of travel of the material as the latter advances through the press.

Figure 2:
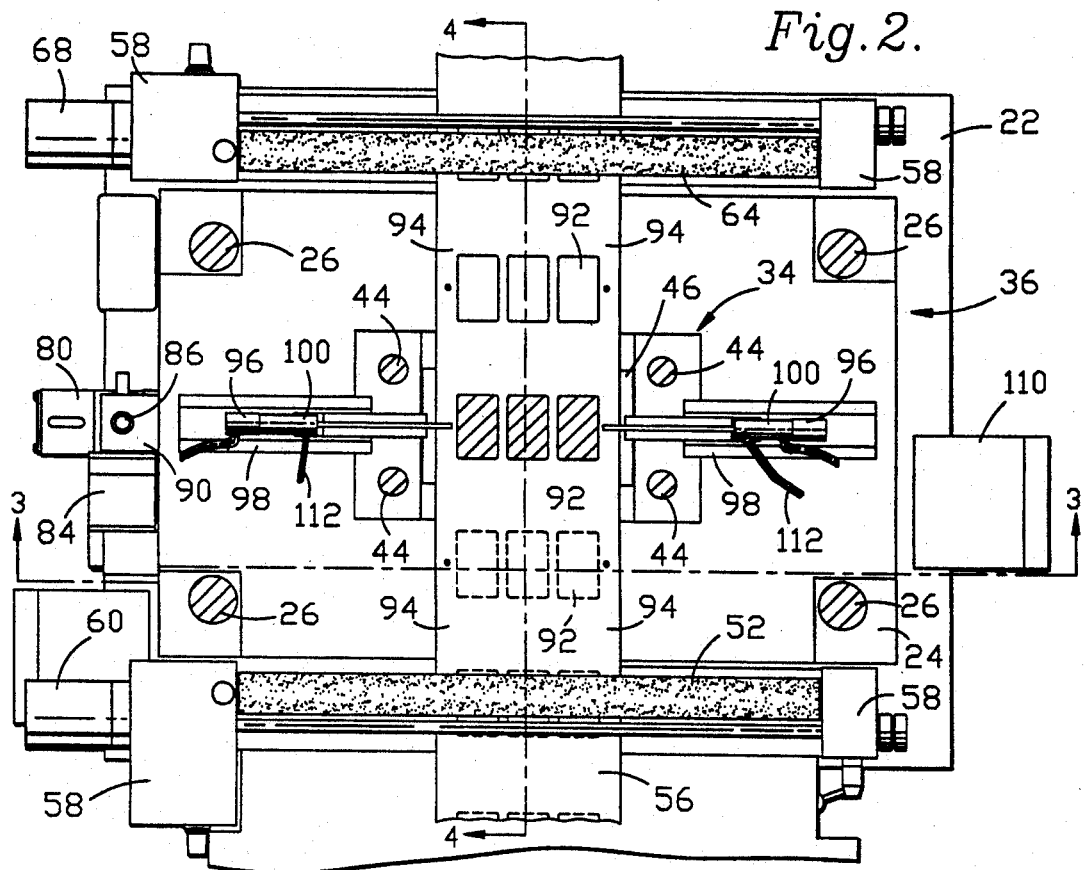
FIG. 2 is a sectional view of the die stamping press taken along line 2—2 of FIG. 3.

As shown in FIG. 2, a bi-directional servomotor 84 is pivotally coupled to the base platen 24 and has a threaded shaft 86 that is received in a pentle 88. The pentle is pivotally connected to a bracket 90 which, in turn, is secured to the bolster 36. The servomotor 84 may be actuated to rotate the shaft and thereby shift the pentle such that the bolster is moved in an arc about a vertical axis designated $\theta$ in FIG. 5.

For exemplary purposes, the material 56 has been shown as including a series of defined areas 92 thereon which represent the outline of the area to be subjected to a processing operation at the die unit. It is understood that the shape of the defined areas as shown is variable.

In order to be used with the registration system of the present invention, the material is provided with at least one, and preferably two indicia 94 located in predetermined positions relative to each defined area 92 of the material. Where only longitudinal and lateral adjustments are to be carried out on the material, it is only necessary to provide one indicium in connection with each defined area of the material. However, where an angular adjustment is to be made along with longitudinal and lateral adjustments, it is necessary either to provide two separate, spaced indicia relative to each defined area, or to supply a single indicium having at least two spaced edges thereon which are angled relative to one another in order to permit a comparison to be made between the angular position of the edges and a desired angular position.

As can be seen from FIG. 2, the defined areas 92 of the material and the indicia 94 are disposed on a first surface of the material which faces upward during travel of the material through the die press. Preferably, the indicia are located adjacent opposing lateral edges of the material.

Having thus explained the construction of the die cutting press with which the registration system of the present invention is employed, various preferred constructions of the registration system will now be described.

The registration system of a first preferred embodiment includes two cameras 96, each being laterally displaced from the material as shown in FIG. 2. Each camera is preferably a charge coupled device (CCD) type camera, several different brands of which are currently available. Each CCD camera is adapted to receive an image and produce an analog output representative thereof. A camera mount assembly 98 is provided in association with each camera and is secured to the bolster 36 so that the cameras 96 move with the die unit 34 relative to the material. Each camera 96 is supported on one of the mount assemblies 98 and is directed laterally relative to the material.

Figure 8:
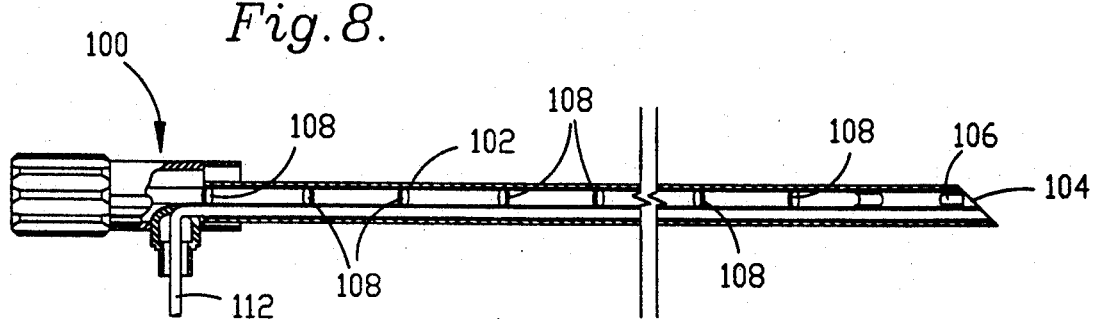
FIG. 8 is a perspective view of a camera and a borescope assembly employed in the first preferred embodiment of the invention.

A borescope 100 is provided for each camera and extends between the camera and a predetermined location relative to the die unit which corresponds to one of the predetermined positions of the indicia 94 relative to each defined area 92 of the material. As shown in FIG. 8, each borescope 100 includes a tube 102 connected at a first end to the camera 96. The tube is provided with an angled mirror or prism 104 adjacent a free end thereof which reflects light received from the predetermined location into the tube. An objective lens 106 is provided adjacent the mirror or prism and directs the light through an achromatic lens system 108 into the camera.

Figure 9:
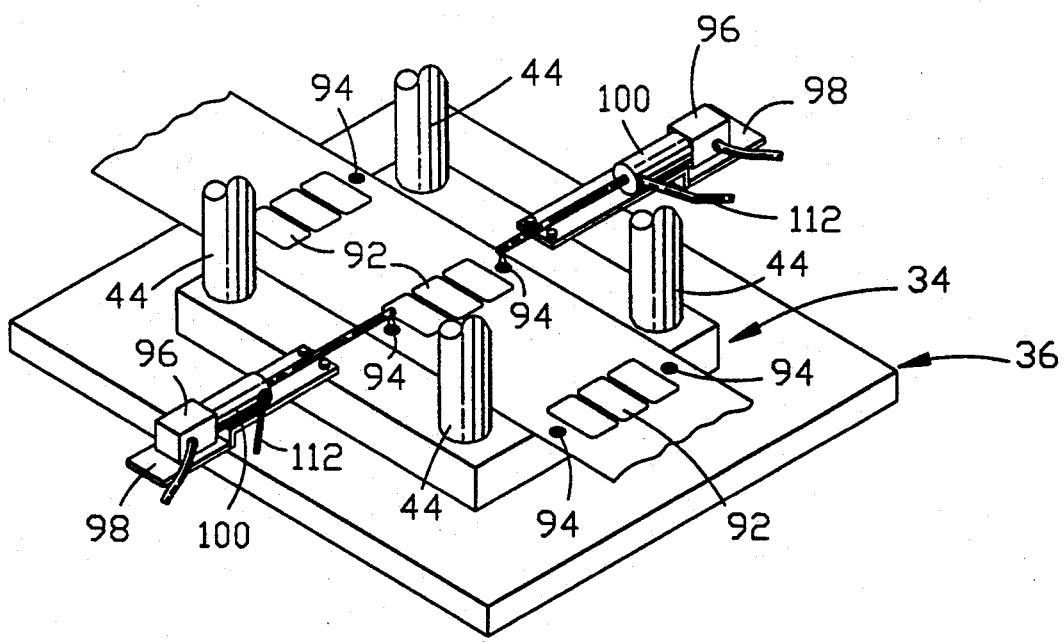
FIG. 9 is a partial perspective view of the registration system constructed in accordance with the first preferred embodiment of the invention.

A light source 110 is provided on the press, along with means for directing light toward the predetermined location, in order to permit illumination of the upper surface of the material at the predetermined location. Optic fibers 112 may be provided which extend from the light source through the tube of the borescope to a termination located adjacent the end of the borescope so that light passing through the fibers is directed onto the upper surface of the material, as shown in FIG. 9. Preferably, the fibers 112 direct light at an angle toward the predetermined location in order to reduce glare from the upper surface of the material as the material comes into the field of view of the borescope.

Figure 10:
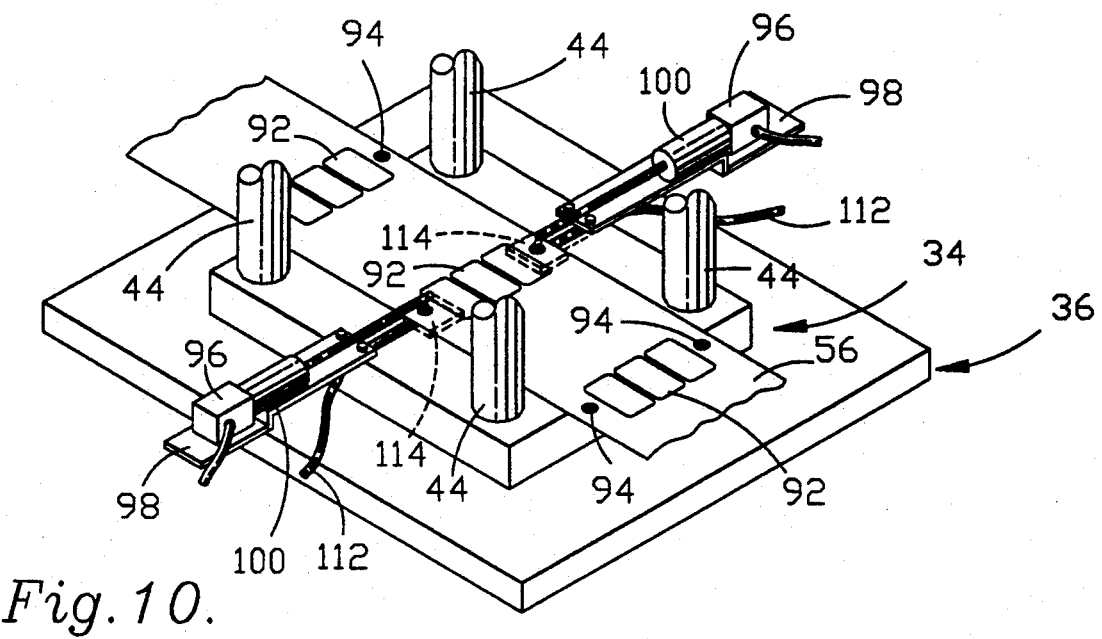
FIG. 10 is a partial perspective view of an alternate registration system constructed in accordance with the first preferred embodiment of the invention.

An alternate embodiment of the lighting means is shown in FIG. 10, for use on the first preferred embodiment. As illustrated, light from the light source is directed via optic fibers 112 to a piece of clear plastic material 114 or the like underlying the material. The plastic material 114 defuses the light received from the optic fibers 112 in order to provide back lighting of the material so that the image of the material is projected through the borescope 100 and into the camera 96.

Figure 7:
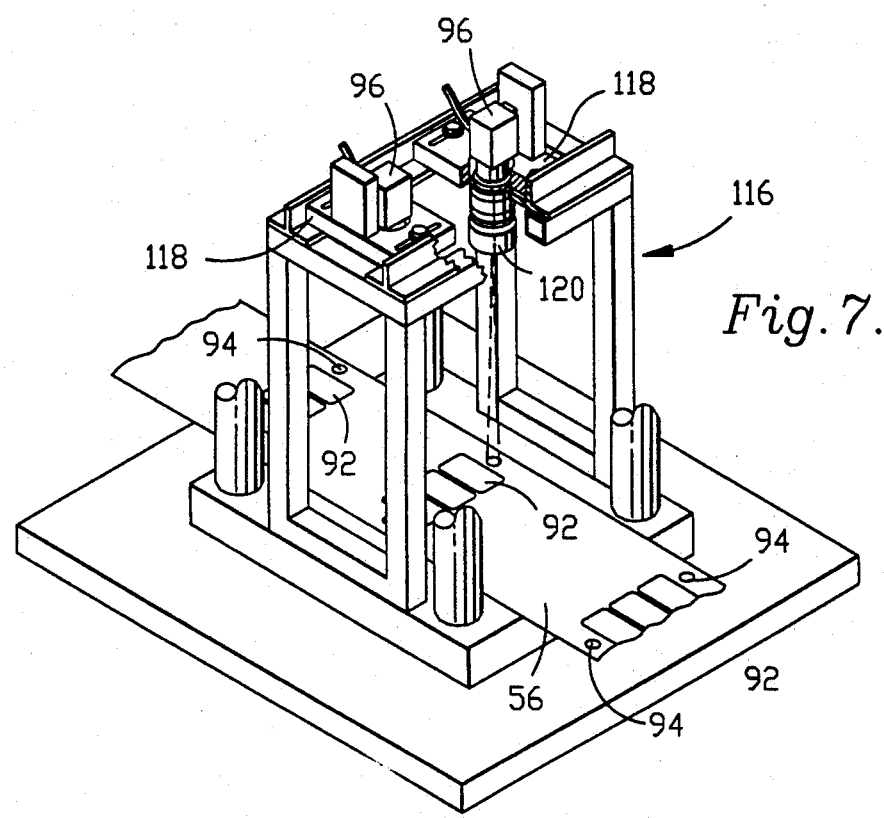
FIG. 7 is a perspective view, of a camera mounting assembly constructed in accordance with a further embodiment, partially broken away to illustrate a camera supported on a mounting bracket.

An alternate camera mounting arrangement capable for use in connection with the registration system of the first preferred embodiment is illustrated in FIG. 7, and includes the use of an upstanding frame 116 which is interposed between the die holder and the punch holder. Each camera 96 is supported on a mounting plate 118 that may be adjusted laterally relative to the upstanding frame, and a space is provided between the mounting plates through which a specially designed punch may pass in order to carry out a punching operation. Each camera is fitted with a lens system 120 and is positioned immediately over the die so that the camera may be pointed toward and focused directly on predetermined locations relative to the die unit. Although not shown in FIG. 7, either a direct lighting system or a back lighting system may be used with this camera arrangement.

The computer control assembly 20 also makes up a part of the registration system of the first preferred embodiment. The control assembly includes reference means for providing reference image data representative of the desired position of the indicia within the images received by the camera. Preferably, the reference image data is digital data representative of an exemplary image in which an indicium is properly positioned relative to the predetermined location. The digital data is input into the reference means prior to initiating actual registration of the material within the press so that the data may be compared with actual data obtained from the cameras.

Comparison means are provided for comparing the stored reference image data with data representative of the images received by the cameras and for generating longitudinal, lateral and angular difference data representative of the difference in position between the indicia within the images and the stored reference image data. In order to carry out this comparison, conversion means are provided for converting the analog signals output by the cameras into digital data representative of each of the images, wherein each image is divided into a number of rows and columns each filled with a plurality of pixels having a darkness value represented by the digital data associated with that pixel.

By comparing the digital representation of the images received from the cameras with the stored reference image data, it is possible to determine the longitudinal, lateral and angular displacement between the actual and desired positions of the indicia by counting the number of pixel locations between the desired positions of the indicia and the actual position of the indicia within the images in which they appear. Software is available for use in making this comparison, a particular brand of such a software being Cognex 1500, version 1.4, marketed by Cognex Corporation, 15 Crawford St., Needham, Mass. 02194.

The computer control assembly also includes means for receiving the longitudinal, lateral and angular difference data from the comparison means and operating the servomotors 60, 66, 80, 84 to shift the material and/or the die unit in the longitudinal, angular and lateral directions to compensate for the difference in position between the indicia within the images and the desired positions of the indicia so that one of the defined areas of the material is in register with the die unit. This control means may either be provided as a part of the computer used for operating the comparison means, or may be a separate computer.

As described above, the material is preferably provided with a pair of indicia associated with each defined area thereof. Where two indicia are used, they may be of any desired shape, such as a circle or dot, the significant parameter being the position of each of the indicia relative to the defined area to be processed. Alternatively, it is possible to provide a single indicia such as a square or T-shaped mark in association with each defined area, which shape permits a comparison to be made between the angular orientation of the indicia relative to the die unit and a desired angular orientation as represented by the stored reference image data.

Figure 11:
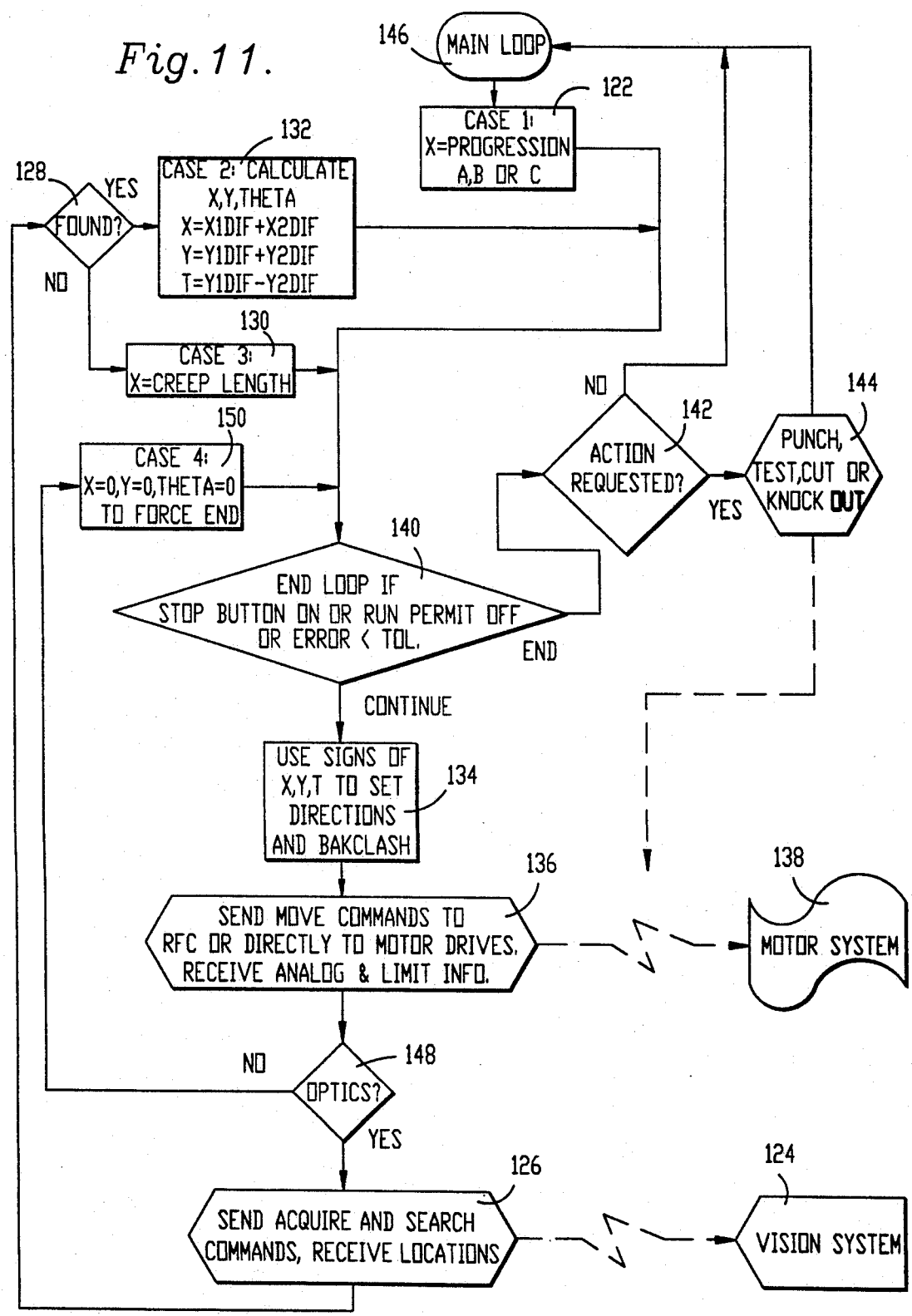
FIG. 11 is a flow diagram of the method used in carrying out a registration operation in accordance with the first preferred embodiment of the present invention.

Turning to FIG. 11, operation of the die press and registration system of the first preferred embodiment of the present invention is illustrated in the form of a flow diagram. Prior to conducting a processing operation, an operator first enters the necessary setup parameters, run options and models to be used in the operation. Thereafter, the material is fed into the infeed rollers and the servomotors 60, 68 are activated to carry out a pure material move of the material. This initial move is larger than subsequent moves and represents a first progression which is generated in block 122.

Once the material has been fed into the press, images are received by the cameras, designated generally as the "vision system" in block 124, pursuant to instructions received from the control assembly in block 126. The images are taken of the portions of the upper surface of the material located at the predetermined locations upon which the cameras are focused. The cameras receive the images and provide an analog output for each image which is digitized and compared with the reference image data in decision block 128 in order to determine whether the indicia appear within the fields of view of the cameras. If the indicia do not appear within the fields of view then a fixed move of about 0.1 inches, referred to as a "creep" is initiated in block 130, and these steps are repeated until the indicia are found to appear within the fields of view.

Once the indicia are detected within the fields of view of the cameras, as occurs when the indicia are located at the predetermined locations upon which the cameras are focused, the images received by the cameras are again digitized and compared with the reference image data in block 132 in order to determine the difference between the positions of the indicia within the images received by the camera and the desired positions as represented by the reference image data. This positional difference is measured along the longitudinal, lateral and angular axes discussed above and is accomplished by determining the number of pixel locations between the actual positions of pixels within the indicia and the desired positions of such pixels.

In determining the amount of correction necessary to align the indicia with the desired positions thereof, the following formulas are used:

$$X = X_{1dif} + X_{2dif}$$

$$Y = Y_{1dif} + Y_{2dif}$$

$$T = Y_{1dif} - Y_{2dif}$$

Where X represents the amount of movement in the longitudinal direction of the material necessary to correct the longitudinal position of the material relative to the die unit; $X_{1dif}$ is the distance, measured in pixels, between one of the indicium and the position represented by the reference image data; $X_{2dif}$ is the distance, measured in pixels, between the other of the indicium and the position represented by the reference image data; Y represents the amount of movement in the lateral direction of the material necessary to correct the lateral position relative to the die unit; $Y_{1dif}$ is the distance between the first of the indicium and the position represented by the reference image data; $Y_{2dif}$ is the distance between the second of the indicium and the position represented by the reference image data; and T represents the amount of angular movement about the $\theta$ axis necessary to correct the angular position of the material relative to the die unit.

Once the amount of correction necessary in each of the three directions is determined, the (+) or (−) signs of the X, Y and T values are calculated in block 134 in order to set the direction in which the die unit and material are to be moved relative to one another in order to register the defined area with the die unit. Actual movement of the floating bolster is accomplished by generating move commands in block 136 and delivering drive pulses to the servomotors 60, 68, 80 and 84 represented by block 138.

The frequencies and duty cycles are determined by the response characteristics of the system. In addition to shaping individual pulses, the computer may also be programmed to change the frequency in a process known as ramping. The number of pulses in a pulse train is scaled to correspond to the desired distance of travel. This desired distance, acceleration and the maximum velocity are input by a user during setup. This information is then translated by the computer into number, ramp, and frequency of steps prior to entering the main loop of the program. The number of steps is further modified by the comparisons discussed above between the position of the indicia within the image and the desired positions.

The actual pulses may be generated by a pulse generator chip or by digital output from a digital input/output board. Both methods are used in the preferred constructions of the apparatus by tying both outputs to the same motor driver. Long progressions are generated by a roll feed controller (RFC) while smaller adjustments are handled directly by the computer.

A linear transducer may be provided for monitoring the position of the bolster. If movement of the bolster beyond the limits of travel thereof is attempted, movement ceases or is redirected to a home position and further registration is halted.

Once the material has been positioned so that the indicia appear within predetermined tolerance distances of the proper positions within the images of the cameras, relative to the reference image data, registration of the material is complete and processing of the material may be carried out. This step of the process is shown in block 140 and causes the desired action requested to be carried out in blocks 142 and 144.

Thereafter, the main loop, as represented by block 146, is addressed and the servomotors 60, 68 are activated to move the material to a position in which the next defined area of the material is positioned generally in alignment with the die unit so that a subsequent operation may be performed. These rapid movements of the material in the longitudinal direction from one defined area to the next represent progressions which are controlled by the computer in block 122.

It is possible during operation of the registration system to deactivate the cameras if desired. This mode of operation is shown as a decision block 148 in the flow diagram and simply causes the control means to set the difference values of X, Y, and $\theta$ to 0 in block 150 to force an end to the registration operation so that the defined area may be processed. Preferably, this option is used in testing and for speed when the lateral and angular position of the material is set and the progression between defined areas is very accurate.

A registration system constructed in accordance with a second preferred embodiment of the invention is illustrated in FIGS. 12-17. This registration system is adapted for use on the die cutting press previously described herein, and as disclosed in the aforementioned U.S. Pat. No. 4,555,968.

Figure 12:
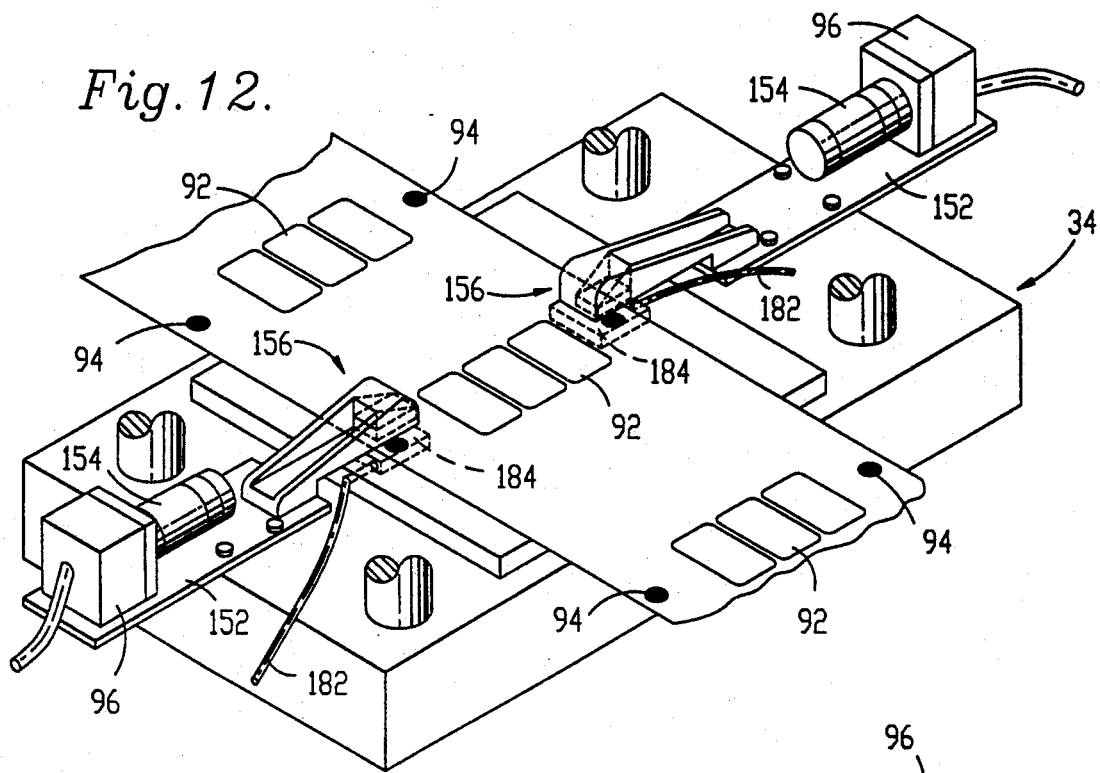
FIG. 12 is a partial perspective view of a registration system constructed in accordance with a second preferred embodiment of the invention.

Turning first to FIG. 12, the registration system is illustrated as including a pair of cameras 96, each laterally displaced from the material 56 and opposing the opposite camera. Preferably, the cameras are charged coupled devices (CCDs), as described with reference to the first preferred embodiment.

Each camera is attached to a mounting plate 152 which is, in turn, secured to either the die unit 34 or the bolster 36 so that the cameras 96 move with the die unit 34 relative to the material. The mounting plate 152 remains fixed to the bolster 36 and is secured by a plurality of bolts or the like, and the cameras 96 are removable from the mounting plate. For example, each camera may be supported on one of the mounting plates by a bolt or the like passing up through the mounting plate into the camera body.

Image reflecting means are fixed to the bolster 36 on each of the mounting plates 152 and move with the die unit 34. Each of the image directing means directs an image from a region of the die unit 34 toward the associated camera when the camera is pointed toward the image directing means and focused thereon by a suitable lens 154.

The image directing means includes a prism assembly 156, as shown in FIG. 14. The prism assembly includes a body 158 having a plurality of holes 160 through which bolts or the like may be passed to connect the assembly to the mounting plate 152 fixed on bolster 36. In addition, an elongated slot 162 is formed in the body 158 which extends from a first end thereof toward a second end thereof.

Adjacent the second end of the body, a wall 164 is formed by the termination of the slot 162. The wall includes an angled surface 166 which slants relative to the line of sight through the slot 162 by an angle of 45°, or any other angle sufficient to reflect an image from the desired region of the die unit through the slot toward a camera supported on the mounting plate 152.

The surface 166 of the wall is polished to form a reflective surface or is provided with a prism 167 as shown in FIG. 16, and the portion of the body underlying the wall is removed to define an open space 168 such that an image of the area underlying the body beneath the wall is retracted at a 90° angle through the elongated slot toward the associated camera supported on the mounting plate.

Figure 13:
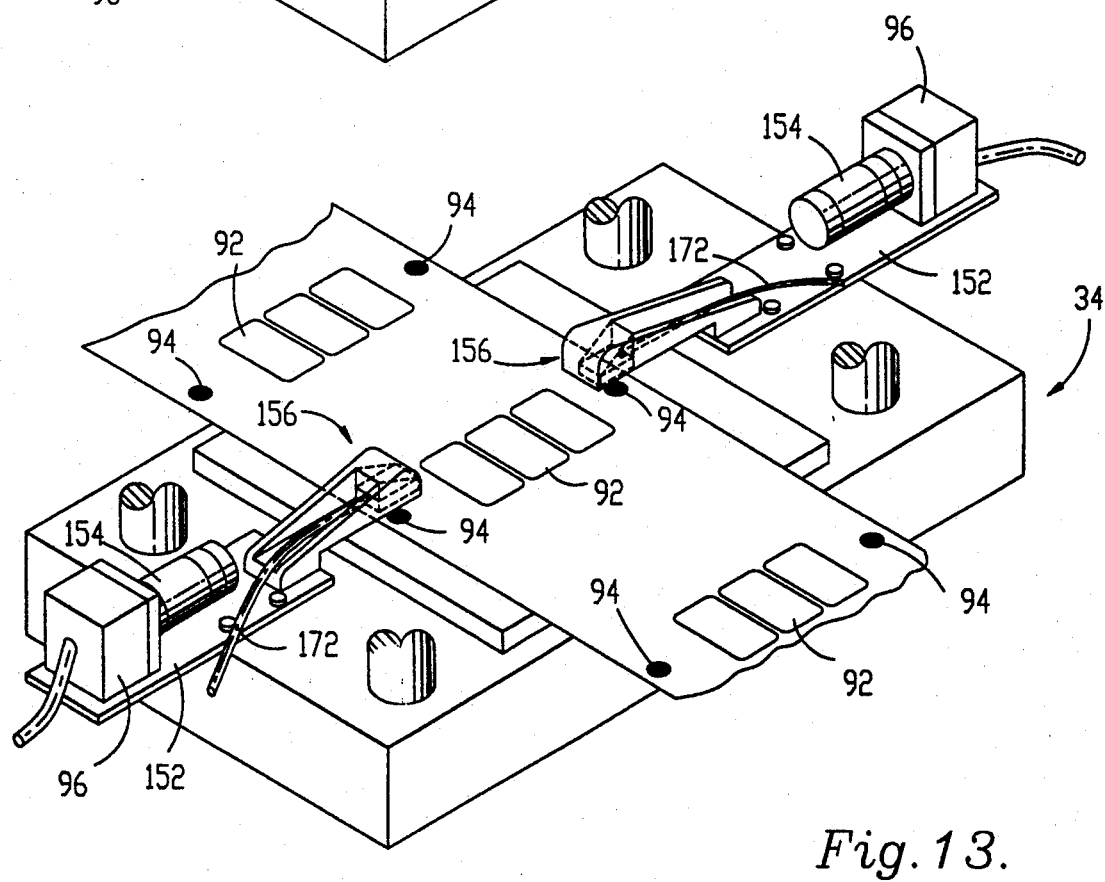
FIG. 13 is a partial perspective view of an alternate registration system constructed in accordance with the second preferred embodiment of the invention.

A channel 170 is formed in the bottom surface of the elongated slot 162 and is adapted to receive illuminating means such as a fiber optic cable 172, as shown in FIG. 13. The cable passes through the channel 170 and is received within a bore 174, as shown in FIG. 15. A pair of detents 176 are provided within the bore for holding the fiber optic cable 172 relative to the body. Preferably, the fiber optic cable includes a termination element having a groove which mates with the detents to provide a snap-fit connection for holding the cable in place.

A small block 178 of clear plastic material or the like may be secured within the area 168 of the body beneath the wall 164 in order to disperse the light provided by the illuminating means to the desired region beneath the body.

Turning to FIG. 17, the block of clear plastic material is illustrated as including a reference indicia 180 that is affixed thereto. For example, the indicia may be printed onto the surface of the block 178 or applied as a sticker. The position of this reference indicium remains fixed relative to the body 158 of the reflector assembly 156 and, therefore, to the bolster 36.

The illumination provided by the positioning of an optical fiber within the channel of the body illuminates an upper planar surface of the material 56 so that the image directed to the cameras 96 is bright enough to be sensed.

An alternate construction of the illuminated means is illustrated in FIG. 12, wherein illumination is provided to the underside of the material 56. According to this construction, light from a light source is directed via optic fibers 182 to a block 184 of clear plastic material or the like underlying the elongated material. The plastic material defuses the light received from the optic fibers in order to provide back lighting so that the image of the material is directed to the cameras.

It is noted that the material employed with the registration system of the second preferred embodiment is identical to the material described with reference to the first preferred embodiment, and includes a series of defined areas 92 as well as at least one, and preferably two indicia 94 laterally spaced from each defined area. If only one indicium is to be used in connection with each defined area, it must be provided with at least two spaced edges thereon which are angled relative to one another in order to permit a comparison to be made between the angular position of the edges and a desired angular position.

As mentioned, each prism assembly 156 directs an image from a region of the die unit 34 underlying the reflective surface 166 toward the associated camera. The region appearing in each image includes a preset location of the die unit corresponding to the position of an indicium 94 provided on the material when the elongated material is in the desired predetermined relationship relative to the die unit.

The preset locations included in the regions visible to the cameras 96 via the prism assemblies are determined prior to operation of the press unit by prepositioning the material at a desired position relative to the die unit and generating images of the desired relationship between each of the indicia 94 on the material and the reference indicium 180 associated with that indicium.

The computer control assembly 20 is similar to the assembly described above in that reference means are provided for producing reference image data representative of the desired positions of the indicia 94 within the images received by the cameras 96. However, instead of making a comparison between the actual positions of the indicia within the images and the expected positions, various additional calculations are made in order to ensure that the indicia 94 are properly positioned relative to the reference indicia 180.

Although it is desired for the cameras 96 to remain fixed relative to the bolster 36 and die unit 34 during operation of the press, some movement of the cameras relative to the bolster occurs. For example, during movement of the bolster during a given press cycle to position the die unit relative to the material, vibration is generated each time the bolster accelerates or decelerates. This vibration or the sudden starting or stopping movement of the bolster can cause the cameras to change position on the mounting plates 152.

One advantage of the second embodiment of the invention beyond the advantages of the first embodiment is that by fixing the reference indicia 180 on the bolster 36, the reference means is able to calculate the amount of compensation necessary to properly position the die unit relative to the material based upon the position of the indicia 94 on the material relative to the reference indicia 180.

According to the first embodiment, the material is positioned relative to the die unit based upon a comparison between the actual and expected positions of the indicia 94 within the images received from the cameras. Thus, if one or both of the cameras move relative to the die unit, the image received changes altering the expected position or positions of the indicia 94 on the die unit at which the indicia on the material are expected to appear for proper registration of the defined areas 92. Misregistration occurs when such movement of the cameras results.

In contrast, by employing the reference indicia 180 in the comparison between the actual and expected positions of the indicia 94 on the material 56, compensation is automatically made for any change in the position of the cameras, since the relative positions between the indicia on the material and the reference indicia remains unchanged regardless of where the indicia (on material and reference indicia) appear within the images received by the cameras.

Preferably, the reference image data is digital data representative of exemplary images in which the indicia are properly positioned relative to the reference indicia at the preset locations of the die unit. The digital data is input into the reference means prior to initiating actual registration of the material within the press so that the data may be compared with actual data obtained from the cameras.

Comparison means are provided for comparing the stored reference image data with data representative of the images received by the cameras and for generating longitudinal, lateral and angular difference data representative of the difference in position between the indicia within the images and the stored reference image data. In order to carry out this comparison, conversion means are provided for converting the analog signals output by the cameras via lines into digital data representative of each of the images, wherein each image is divided into a number of rows and columns each filled with a plurality of pixels having a darkness value represented by the digital data associated with that pixel.

By comparing the digital representation of the images received from the cameras with the stored reference image data, it is possible to determine the longitudinal, lateral and angular displacement between the actual and desired positions of the indicia by counting the number of pixel locations between the desired positions of the indicia and the actual position of the indicia within the images in which they appear.

By calculating the difference in position between the expected position of each reference indicia and the actual position thereof, and by accounting for this difference in position when calculating the difference in position between the expected position of each indicia on the material and the actual position thereof, it is possible to compensate for any movement of one or both of the cameras that would cause the position of the reference indicia within the image to change. Software is available for use in making this comparison, a particular brand of such software being Cognex 1500, version 1.4, marketed by Cognex Corporation, 15 Crawford St., Needham, Mass. 02194.

The computer control assembly also includes means for receiving the longitudinal, lateral and angular difference data from the comparison means and operating the servomotors 60, 66, 80, 84 to shift the material and/or the die unit in the longitudinal, angular and lateral directions to compensate for the difference in position between the indicia within the images and the desired positions of the indicia so that one of the defined areas of the material is in register with the die unit. This control means may either be provided as a part of the computer used for operating the comparison means, or may be a separate computer.

Returning to FIG. 11, operation of the die press and registration system of the second embodiment of the present invention is identical to that illustrated and discussed above with respect to the first embodiment, except that two additional steps are carried out during each press cycle.

The first additional step carried out by the registration system carried out by the second preferred embodiment is conducted before or during the comparison step in Block 132, and includes calculating four offset variables. These variables are measured in pixels or picture elements and specify the amount of camera offset detected with each new press cycle. The calculation of these variables is as follows:

$$X_{1offset} = X_{1refexpected} - X_{1refactual}$$

$$X_{2offset} = X_{2refexpected} - X_{2refactual}$$

$$Y_{1offset} = Y_{1refexpected} - Y_{1refactual}$$

$$Y_{2offset} = Y_{2refexpected} - Y_{2refactual}$$

Wherein $X_{1refexpected}$ and $Y_{1refexpected}$ are the coordinates of an expected position of the reference indicium associated with one of the cameras, and $X_{2refexpected}$ and $Y_{2refexpected}$ are the coordinates of an expected position of the reference indicium associated with the other camera. The variables $X_{1refactual}$, $Y_{1refactual}$, $X_{2refactual}$, and $Y_{2refactual}$ represent the coordinates of the reference indicia within the images from the respective cameras.

After calculation of the offset variables, but prior to the comparison carried out in Block 132, four difference variables are calculated. These variables are also in pixels or picture elements. The calculation of these difference variables is as follows:

$$X_{1dif} = X_{1expected} - X_{1actual} + X_{1offset}$$

$$X_{2dif} = X_{2expected} - X_{2actual} + X_{2offset}$$

$$Y_{1dif} = Y_{1expected} - Y_{1actual} + Y_{1offset}$$

$$Y_{2dif} = Y_{2expected} - Y_{2actual} + Y_{2offset}$$

Wherein $X_{1expected}$ and $Y_{1expected}$ are the coordinates of the expected position of one of the indicia within the image received by the camera associated therewith, and $X_{2expected}$ and $Y_{2expected}$ are the coordinates of the expected position of the other indicium on the material within the image received by the camera associated therewith. The variables $X_{1actual}$, $Y_{1actual}$, $X_{2actual}$ and $Y_{2actual}$ represent the coordinates of the actual positions of the indicia within the images. In any given image received by one of the cameras, only one reference indicium and one indicium from the elongated material is visible.

The variables determined from the foregoing formulas are then employed in the comparison carried out in Block 132 in accordance with the formulas described above with reference to the first embodiment and adjustment of position of the die unit relative to the elongated material is carried out as described above.

Although the invention has been described with reference to a preferred embodiment of the invention as shown in the attached drawing figures, it is noted that substitutions may be made and equivalents employed herein without departing from the scope of the present invention as recited in the claims.

What is claimed is:

1. In a die cutting press for elongated material having defined, successive areas and area indicia provided in predetermined positions relative to each of the defined areas, the press including a base platen, a ram platen shiftable toward and away from the base platen, a die unit received in the space between the base platen and the ram platen, and longitudinal shifting means for longitudinally advancing the material along a path of travel to successively feed the defined areas of the material toward the die unit, a registration system for successively positioning the die unit in predetermined relationship to the defined areas of the material as successive defined areas are brought into a position to be processed by the die unit, the registration system comprising:

lateral shifting means for moving the die unit relative to the base platen along a direction of travel transverse to the path of travel of the material;

angular shifting means for rotating the die unit relative to the base platen about a reference axis perpendicular to a plane containing the material;

at least one camera for receiving images;

focusing means for focusing the at least one camera on predetermined locations relative to the die unit corresponding to the predetermined positions of the indicia relative to the defined areas of the material;

reference means for providing reference image data representative of the desired position of the area indicia within each image received by the camera;

means for interrupting successive movement of the areas toward the die unit when a corresponding area indicia is substantially at said predetermined location relative to the die unit and said camera;

comparison means for comparing the reference image data with an image received by the camera after movement of the material has been interrupted with a corresponding area indicia in said predetermined location thereof and for generating longitudinal, lateral and angular difference data representative of the difference in position between the area indicia within the image and the desired position of the area indicia; and control means for receiving the longitudinal, lateral and angular difference data and operating the longitudinal, angular and lateral shifting means to change the position of the material relative to the die unit to compensate for the difference in position between the indicia within the image and the desired position of the indicia so that one of the defined areas of the material is in register with the die unit.

2. The registration system as recited in claim 1, wherein the at least one camera includes a charge coupled device (CCD) for receiving the image and for generating analog signals representative of the image.

3. The registration system as recited in claim 2, further comprising analog-to-digital conversion means for converting the analog signals received by the charge coupled device into digital data.

4. The registration system as recited in claim 1, wherein two cameras are provided, each being displaced from the die unit in a direction transverse to the path of travel of the material through the die unit, the focussing means including a borescope extending between each camera and one of the predetermined locations, each borescope including a tube having a first end adjacent the camera and a second end overlying one of the predetermined locations, means positioned in the second end of the tube for reflecting light from the predetermined location into the tube, and a plurality of lenses within the tube for focusing the reflected light on the camera.

5. The registration system as recited in claim 1, wherein the control means includes means for substantially simultaneously operating the longitudinal, angular and lateral shifting means as may be required to effect said change of the position of the material relative to the die unit.

6. The registration system as recited in claim 5, further comprising lighting means for illuminating the predetermined locations, and wherein the elongated material includes a first surface on which the area indicia are provided and a second surface opposed to the first surface, the lighting means including means for illuminating the first surface of the elongated material so that light is reflected from the first surface and received by the at least one camera.

7. The registration system as recited in claim 5, wherein the elongated material includes a first surface on which the indicia are provided and a second surface opposed to the first surface, the lighting means including means for illuminating the second surface of the elongated material so that light is directed through the material and received by the at least one camera.

8. The registration system as recited in claim 1, wherein two cameras are provided, each of the cameras overlying one of the predetermined locations and being focused on the predetermined location.

9. A method of successively aligning a die unit of a die cutting press with defined areas of elongated material, the material including area indicia provided in predetermined positions relative to each of the defined areas, the method comprising the steps of:

longitudinally advancing the material along a path of travel to successively feed the defined areas of the material toward the die unit;

providing at least one camera for receiving images;

focusing the at least one camera on predetermined locations relative to the die unit corresponding to the predetermined positions of the area indicia relative to the defined areas of the material and receiving images of the material at the predetermined locations;

providing reference means which generates reference image data representative of the desired position of the area indicia within each image received by the camera;

interrupting successive movement of the areas toward the die unit when a corresponding area indicia is substantially at said predetermined location relative to the die unit and said camera;

comparing the reference image data with an image received by the camera after movement of the material has been interrupted with a corresponding area indicia in said predetermined location thereof;

generating longitudinal, lateral and angular difference data representative of the difference in position between the area indicia within the image and the desired position of the area indicia; and moving the material in the longitudinal direction to compensate for the difference in longitudinal position between the indicia within the image and the desired longitudinal position of the indicia, moving the die unit relative to the material along a direction of travel transverse to the path of travel of the material to compensate for the difference in lateral position between the indicia within the image and the desired lateral position of the indicia, and rotating the die unit relative to the material about a reference axis perpendicular to a plane containing the material to compensate for the difference in angular position between the indicia within the image and the desired angular position of the indicia so that one of the defined areas of the material is in register with the die unit.

10. The registration method as recited in claim 9, wherein the step of receiving images of the material at the predetermined locations includes receiving images with a charge coupled device (CCD) so that analog signals representative of the image are produced.

11. The registration method as recited in claim 10, further comprising the step of converting the analog signals received by the charge coupled device into digital data.

12. The registration method as recited in claim 9, wherein the step of receiving an image of the material at the predetermined locations includes receiving light from the predetermined location and reflecting the light into the tube of a borescope provided with a plurality of lenses that focus the reflected light on the at least one camera.

13. The registration method as recited in claim 9, wherein the steps of moving the material and moving the die unit respectively, and of rotating the die unit includes the step of substantially simultaneously as required initiating movement of the material and movement of the die unit, and rotation of the die unit.

14. The registration method as recited in claim 13, further comprising the step of illuminating the predetermined locations, and wherein the illuminating step includes the step of illuminating an upper surface of the elongated material so that light is reflected from the upper surface and received by the at least one camera.

15. The registration method as recited in claim 13, wherein the illuminating step includes the step of illuminating a lower surface of the elongated material so that light is directed through the material and received by the at least one camera.

16. In a die cutting press for elongated material having a planer surface provided with defined, successive areas and area indicia provided in predetermined positions relative to each of the defined areas, the press including a base platen, a ram platen shiftable toward and away from the base platen, a removable die unit positionable in the space between the base platen and the ram platen, and longitudinal shifting means for longitudinally advancing the material along a path of travel to successively feed the defined areas of the material toward the die unit, a registration system for successively positioning the die unit in predetermined relationship to the defined areas of the material as successive defined areas are brought into a position to be processed by the die unit, the registration system comprising:

lateral shifting means for moving the die unit relative to the base platen along a direction of travel transverse to the path of travel of the material;

angular shifting means for rotating the die unit relative to the base platen about a reference axis perpendicular to a plane containing the material;

a first camera for receiving images, the first camera being attachable to the die init at a position laterally disposed from the elongated material;

first image directing means fixed to the die unit for directing an image from a first region of the die unit toward the first camera, the first region including a first preset location of the die unit corresponding to the position of a first area indicium when the elongated material is in the predetermined relationship relative to the die unit, the first image directing means including a reference indicium which appears within the directed image at a fixed position relative to the first preset location;

first focusing means for focusing the first camera on the first image directing means;

reference means for providing reference image data representative of the position of the first preset location within the images received by the first camera;

means for interrupting successive movement of the areas toward the die unit when a corresponding area indicia is substantially at said predetermined location relative to the die unit and said camera;

comparison means for comparing the reference image data with an image received by the first camera after movement of the material has been interrupted with a corresponding area indicia in said predetermined location thereof and for generating longitudinal, lateral and angular difference data representative of the difference between the position of the first indicium within the image and the position of the first preset location within the image; and control means for receiving the longitudinal, lateral and angular difference data and operating the longitudinal, angular and lateral shifting means to change the position of the material relative to the die unit to compensate for the difference in position between the first indicium and the first preset location so that the die unit is in the predetermined relationship with one of the defined areas of the material.

17. The registration system as recited in claim 16, wherein the reference means produces the reference image data by determining the position of the reference indicia within the image received by the first camera and calculating the position of the first preset location relative to the position of the reference indicium.

18. The registration system as recited in claim 16, wherein the first image directing means includes a first prism fixed above the first region and angled to refract the image of the first region toward the first camera, the reference indicium being provided on the first prism so as to appear within the defracted image that is received by the first camera.

19. The registration system as recited in claim 16, wherein the first camera includes a charge coupled device (CCD) for receiving the image and for generating analog signals representative of the image.

20. The registration system as recited in claim 19, further comprising analog-to-digital conversion means for converting the analog signals received by the CCD into digital data.

21. The registration system as recited in claim 16, further comprising:
a second camera for receiving images, the second camera being attachable to the die unit at a position laterally disposed from the elongated material opposite the first camera;
second image directing means fixed to the die unit for directing an image from a second region of the die unit toward the second camera, the second region including a second preset location of the die unit corresponding to the position of an indicium when the elongated material is in the predetermined relationship relative to the die unit, the second image directing means including a reference indicium which appears within the directed image at a fixed position relative to the second preset location;
focusing means for focusing the second camera on the second image directing means,
wherein the reference image data produced by the reference means is representative of the positions of the first and second preset locations within the images received by the first and second cameras.

22. The registration system as recited in claim 16, further comprising lighting means for illuminating the first region.

23. The registration system as recited in claim 16, further comprising mounting means for mounting the first camera on the die unit and for premitting detachment of the first camera from the die unit while the first image directing means remains fixed to the die unit.

24. The registration system as recited in claim 16, wherein the control means includes means for substantially simultaneously initiating operation of the longitudinal, angular and lateral shifting means as may be required to change the position of the die unit relative to that of the material.

* * * * *